May 1, 1928.
H. WESTERGAARD
1,668,477
HEATING ELEMENT
Filed Nov. 19. 1926
2 Sheets-Sheet 1
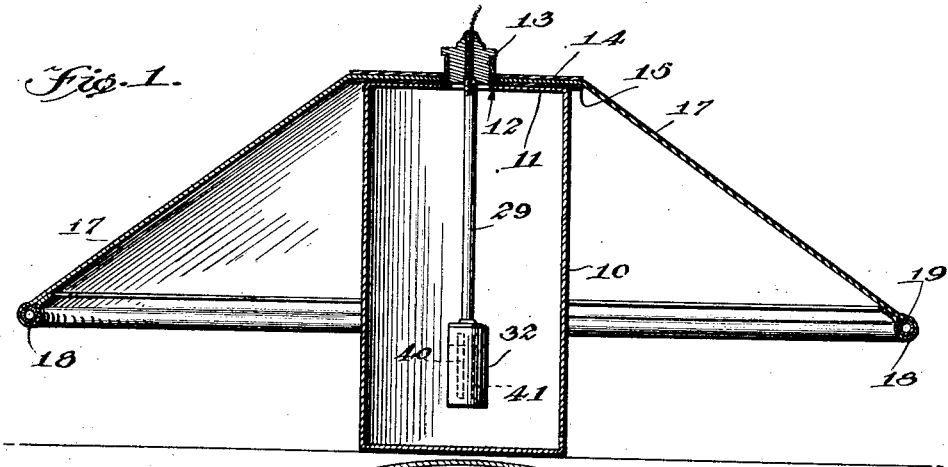
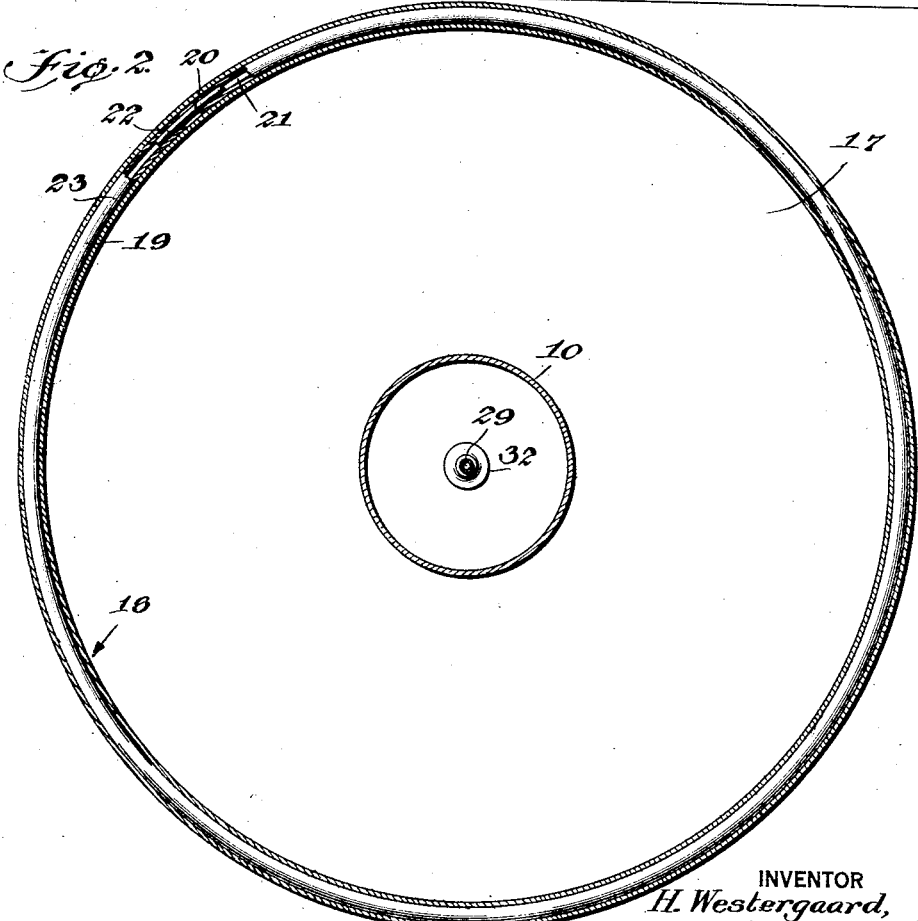
INVENTOR
H. Westergaard,
BY
ATTORNEYS May 1, 1928.                    1,668,477
H. WESTERGAARD
HEATING ELEMENT
Filed Nov. 19, 1926           2 Sheets-Sheet 2
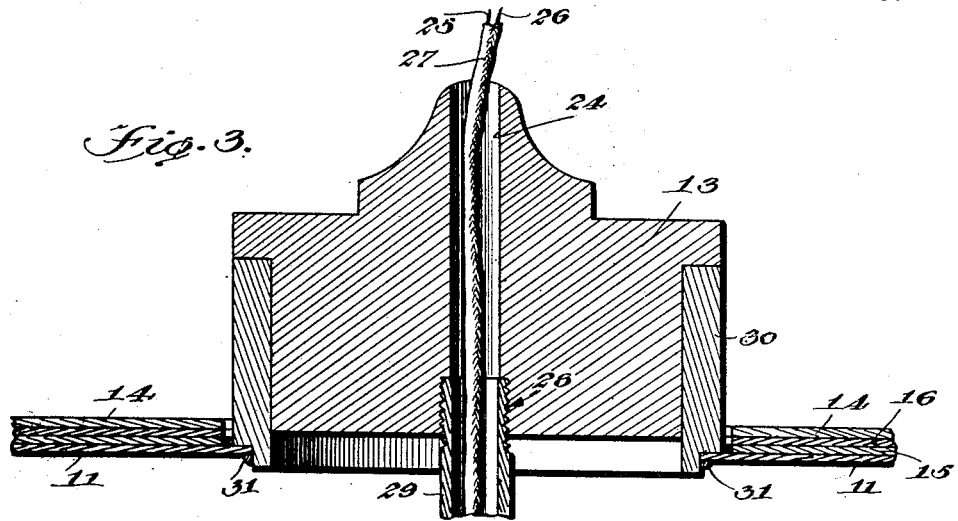
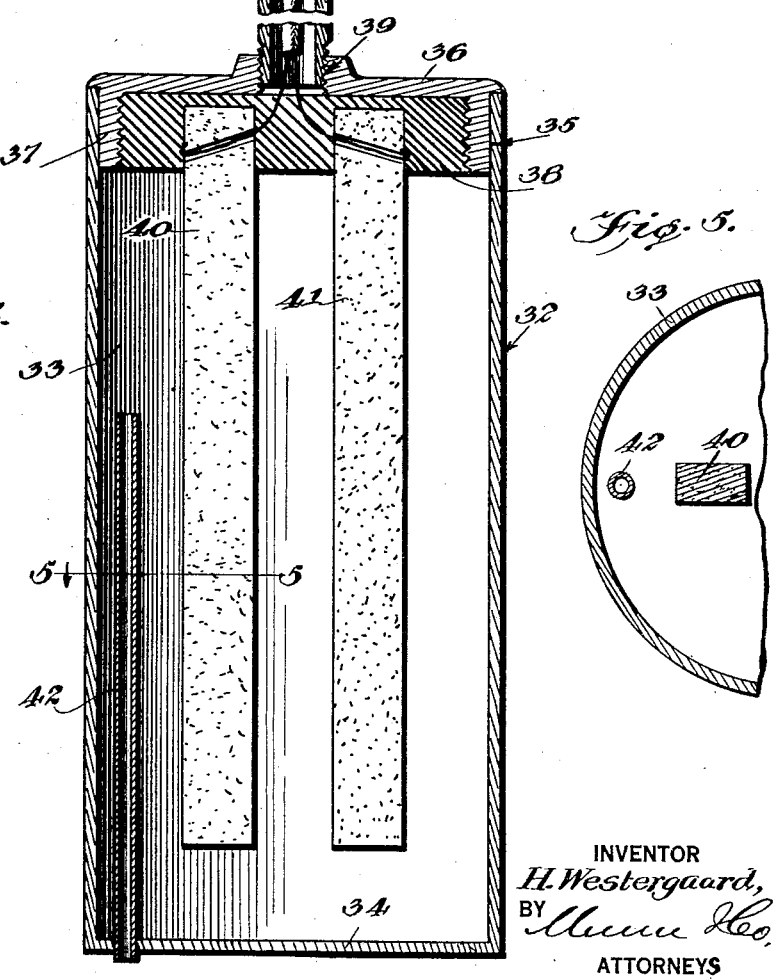
INVENTOR
H. Westergaard,
BY
ATTORNEYS Patented May 1, 1928.

1,668,477

UNITED STATES PATENT OFFICE.

HELGE WESTERGAARD, OF SOLVANG, CALIFORNIA; INGEBORG WESTERGAARD EXECUTRIX OF SAID HELGE WESTERGAARD, DECEASED.

HEATING ELEMENT.

Application filed November 19, 1926. Serial No. 149,426.

This invention relates to heating elements.
A further object of the invention is the provision of a heating apparatus in which an electric heating element is adapted to raise the temperature of a predetermined quantity of water located in a restricted container, the container being in turn enclosed within a large container filled with water, the small container being in restricted communication with the large container.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claim.

Figure 1 is a vertical section of the brooder and heater.

Figure 2 is a horizontal section.

Figure 3 is a vertical section of the stopper for the large container, and

Figure 4 is a vertical section of the heater.

Figure 5 is a horizontal section taken along the line 5—5 of Figure 4.

Referring more particularly to the drawings 10 designates a container adapted to be partially filled with a liquid such as water. The container has a closed top 11 in which a passage 12 is provided for the reception of a rubber cork 13.

The stopper 13 has a central passage 24 disposed vertically and is adapted to provide a conduit for the reception of the electric wires 25 and 26 which are insulated from each other in the casing 27. At the lower end of the passage 24 a threaded countersunk portion 28 is provided into which is screwed the upper threaded end of a pipe 29. The stopper or closure 13 is adapted to be received within the upper portion 30 which projects above the top 11 of the container 10 and fits neatly therein to prevent the loss of fluid from said container. The cylindrical neck or upper portion 20 is welded or secured in any approved manner as shown at 31 to the opening in the top 11.

The heating element generally designated by the numeral 32 is suspended by means of the pipe 29 from the stopper 13. The heater consists of a casing 33 having a closed bottom 34 and an open end 35. A closure 36 having flanges 37 is snugly fitted in the opening 35. A disc 38 formed of rubber or litharge is screwed into the internal threads of the flange 37. The cap 36 is provided with a central threaded passage 39 into which is screwed the lower threaded end of the pipe 29. The wires 25 and 26 passing through the pipe 29 are imbedded in the disc 38 and with a wire 25 secured to the top of a heating element 40 while the wire 26 is secured to the top of a heating element 41, each of the heating elements being imbedded in the disc 38. The bottom 34 of the casing or container 33 is provided with an opening through which is inserted a pipe 42 having a restricted diameter. This pipe projects externally of the bottom 34 and extends upwardly into the casing 33 for a predetermined distance.

The operation of my device is as follows: The container 10 is filled with a predetermined quantity of water and the heating element 32 is inserted into the container by means of the pipe 29 suspended from the cork 13 and the heating element is moved downwardly into the container a sufficient distance so that the cork 13 will be fitted into the cylindrical collar or upright 30 at the opening 12 in the top 11 of the container 10.

The heating element is a generator of heat and operates for heating through the walls of the element. The volumetric capacity of the tube 42 is of importance in the operation of the device since if it is smaller than the volume of the quantity of the steam being discharged through said tube, water is liable to enter the member 32 when a bubble of steam escapes slowly and at such a time where there is an approximate balance of pressure between the input and the output. If a large seal is provided a very sensitive element is had which secures against overheating. It is particularly important to have the correct cross sectional area of the tube 42 because of the fact that if water entering the container 32 overcharges the same before the subsequent generation of steam checks the inflow, an unnecessary quantity of steam will be generated and expelled before the element is capable of adjusting itself to the work. On the other hand the tube 32 must terminate close to the top wall of the container to secure the proper outflow of gases formed therein whenever any steam is expelled.

When the heating element in the casing 33 has heated the water in said casing to a predetermined degree the water or the steam created therein will exert sufficient pressure within said casing to prevent water from entering said casing and will also force water from said casing. However, when the water in the casing falls sufficiently either by reason of the cutting off of the current to the heating element the pressure in said casing will fall, and therefore, water from the outer container will enter the casing from the pipe 42 so that there will be an interchange of water between the member 32 and the tank 10. The interchange of heat between the casing 33 and the tank 10 will be continuous and since sufficient heat is dissipated from the water in the tank 10 the temperature of the water in said tank will never rise to a point where it will injure young chickens should they come in contact with the tank.

I claim:

A heater comprising a container adapted to be partially filled with water, a plug for closing the opening, a casing supported by the plug, a heating element mounted in the casing, a tube connected with the bottom of the casing and in open communication with the container, said tube extending upwardly in the casing and terminating adjacent the top, the upper end of the tube being in open communication with the casing, said tube permitting the interchange of water between the casing and the container.

HELGE WESTERGAARD.